United States Patent Office 3,241,916
Patented Mar. 22, 1966

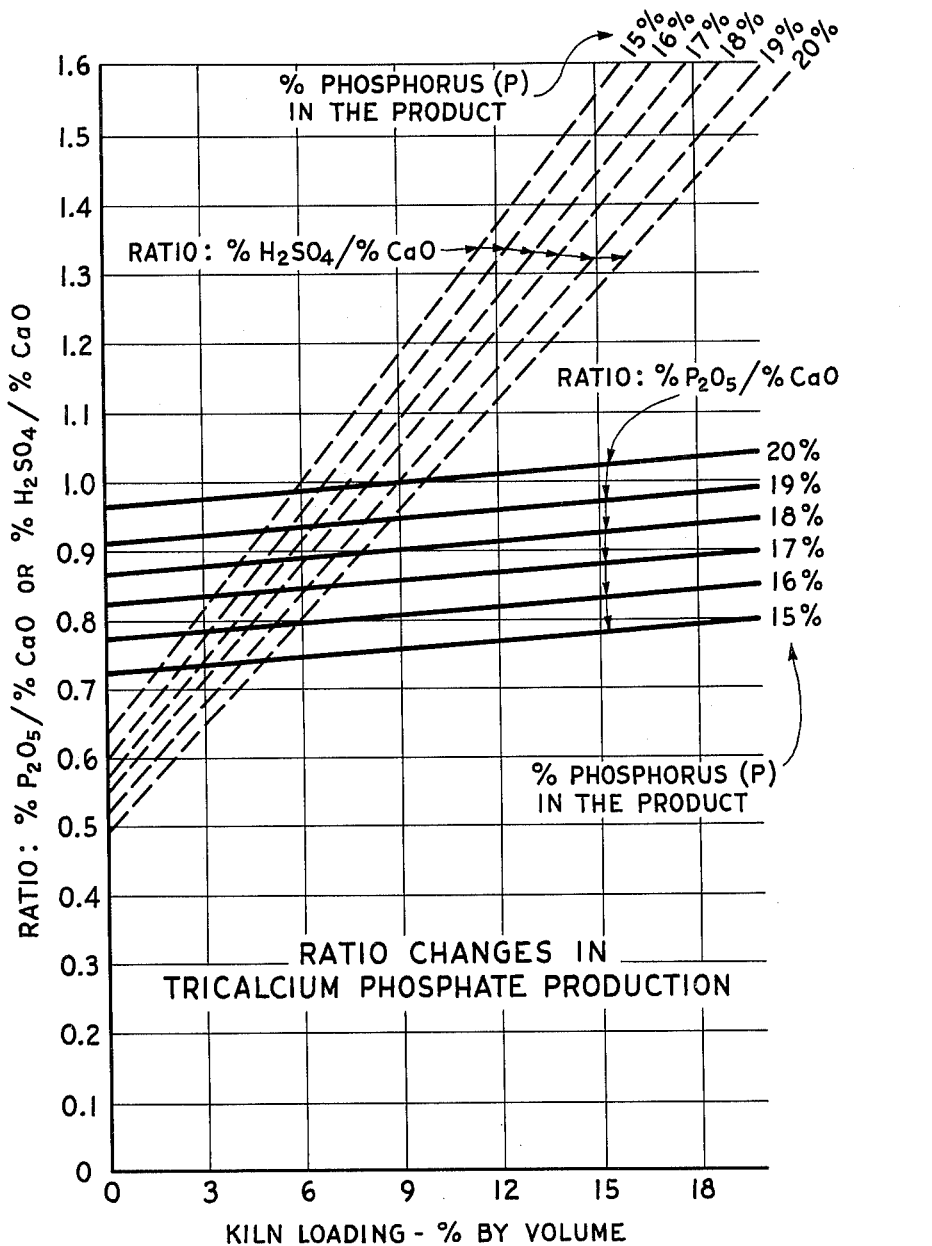

3,241,916
TRICALCIUM PHOSPHATE
John H. Hinkle, Jr., Houston, Tex., Everett J. Weaver, Morton Grove, Ill., and Lynnval M. Smith, Baytown, Tex., assignors to Hooker Chemical Corporation, Niagara Falls, N.Y., a corporation of New York
Filed Dec. 5, 1963, Ser. No. 328,421
8 Claims. (Cl. 23—109)

This application is a continuation-in-part of our co-pending application Serial No. 708,832, filed January 14, 1958, and now abandoned, which application is a continuation-in-part of application Serial No. 682,801, filed September 9, 1957, and now abandoned.

This invention relates to a process for the manufacture of defluorinated phosphates and more particularly relates to a continuous process for manufacturing enriched defluorinated phosphates useful as feeding supplements for livestock and poultry.

In recent years, increasing use has been made of phosphorus-containing materials to supplement the diet of animals and poultry, and in particular cattle and sheep, thereby preventing depravement of appetite, muscular weakness and similar disorders frequently caused by phosphorus deficiencies in their diets. Generally, these phosphorus-containing supplements are prepared from naturally occurring phosphate rocks which also contain appreciable amounts of substituents, such as fluorine compounds, which would have a detrimental effect on the animals if ingested. Frequently, these phosphorus-containing supplements are tricalcium phosphate products prepared by calcining a mixture of phosphate rock, sulfuric acid, and phosphoric acid at a temperature sufficient to effect evolution of the fluorine values from the phosphate rock and form a tricalcium phosphate product having the desired phosphorus content. Desirably, such tricalcium phosphate products contain about 15 to about 20 percent by weight phosphorus, the major amount of which is present as the ortho phosphates, with no more than about 0.01 part by weight of fluorine per one part by weight of phosphorus and not more than about 0.5 percent by weight of sulfate. Additionally, it is also desirable that the tricalcium phosphate product be white in color, not only from the standpoint of appearance, but additionally, as this is an indication of the purity of the material, i.e., that it has a low fluorine and sulfate content.

The methods which have heretofore been used have, generally, been successful in producing a tricalcium phosphate product having the desired compositions as indicated hereinabove, so long as there were no variations in the operating procedures, e.g., the rate of calcination of the raw materials. The rate of calcination will, of course, depend upon the amount of material which is added to the kiln, i.e., the kiln loading, the speed at which the kiln is rotated, the size and inclination of the kiln, and the temperature at which the calcination is carried out. Generally, the only one of these factors which will be varied to any appreciable extent during the calcining operation is the amount of material introduced into the kiln or the kiln loading.

Because of the nature of the reaction which takes place during the calcination, it has not, heretofore, been feasible to utilize large kiln loadings, relative to the size of the kiln, loadings of about 3 to 4 percent by volume of the kiln being typical. Accordingly, when larger amounts of the tricalcium phosphate product are required, attempts to supply this increased demand by increasing the kiln loading, thereby changing the rate of calcination, frequently result in off-grade product. Similarly, variations in the kiln loading which may occur even during periods of relatively normal operation also have often resulted in the production of a tricalcium phosphate product which differs measurably from the desired tricalcium phosphate product as indicated hereinabove.

Heretofore when the production of such off-grade products has occurred, corrections of the variations causing the off-grade product were not possible until appropriate analysis of the product had been obtained, and the indicated adjustment in the ratio of the reactants has been made. The time required to carry out this analysis and make the necessary adjustments, coupled with the quantity of material in both the kiln and the mixing and denning apparatus which precedes the kiln, meant that, frequently, four to five hours or sometimes even more of production time elapsed before a desirable tricalcium phosphate product was again produced. At a typical production rate of about two tons an hour, the resulting 8 to 10 tons of material produced in this time is an appreciable quantity of off-grade product which must be disposed of. Such off-grade product must either be held in storage until a customer is obtained who can use such off-grade material or it must be reworked by recirculation back through the kiln to obtain a product of the desired composition. Although both of these alternatives are undesirable, up to the present time no suitable means have been available whereby the production of off-grade product may be prevented when variations in the rate of the process operation are encountered.

It is, therefore, an object of the present invention to provide a method for producing phosphate mineral products, such as tricalcium phosphates, having superior quality and physical properties, which process is operated on a substantially continuous basis.

Another object of the present invention is to provide a process for producing tricalcium phosphate products whereby greater kiln loadings may be utilized, thereby obtaining increased rates of production than have heretofore been possible.

A further object of the present invention is to provide a method for producing tricalcium phosphate products, which method avoids the production of an off-grade product regardless of variations which may occur in the production rate.

Still another object of the present invention is to provide a method which will result in the production of a tricalcium phosphate product having a lower sulfur content than has heretofore been practical.

These and other objects will become apparent to those skilled in the art from the description of the invention which follows.

The drawing which is attached hereto and forms a part hereof is a graphic illustration of the ratio of reactants, which when used result in the production of products having uniform analyses even at different rates of production.

It has now been found that in the process for making a defluorinated tricalcium phosphate, wherein a mixture of sulfuric acid, phosphoric acid, and a phosphate rock, containing fluorine and silicon values, in amounts sufficient to form a tricalcium phosphate product having a desired phosphorus content is calcined at a temperature sufficient to evolve fluorine values from the phosphate rock, the form in which the fluorine is evolved depends upon the rate of calcination of the mixture. As the rate of calcination increases, more of the fluorine values are evolved as hydrogen fluoride and as the rate of calcination decreases, more of the fluorine values are evolved as silicon tetrafluoride. The effect of this variation on the tricalcium phosphate produced has been found to be that at increased calcination rates, the acidity in the reaction mixture and the phosphorus content of the product is decreased with the result that the tricalcium phosphate product obtained is high in fluorine and low in phosphorus. Conversely, as the calcination rate decreases, the tricalcium phosphate product obtained is found to be high in sulfate and to have a phosphorus content above that which is desired.

Accordingly, pursuant to the above objects, the present invention includes an improvement in the process of calcining a mixture of sulfuric acid, phosphoric acid, and phosphate rock to produce tricalcium phosphate, which comprises establishing, for the initial calcination rate to used, the optimum ratios of phosphoric acid and sulfuric acid to calcium oxide, in the mixture to be calcined, to produce a tricalcium phosphate product having a phosphorus content of at least about 15 percent by weight of the product and a fluorine content which is not greater than about $\frac{1}{100}$ of the phorous content, admixing the phosphoric acid, sulfuric acid, and phosphate rock in amounts sufficient to provide the thus-established ratios, calcining the thus-obtained mixture at a temperature above the fusion temperature thereof to produce a tricalcium phosphate product having the desired phosphorus and fluorine content, controllably varying the ratios of phosphoric acid and sulfuric acid to calcium oxide in the mixture to be calcined as the rate of calcination of the mixture varies, the $H_3PO_4$ to CaO and $H_2SO_4$ to CaO ratios being increased as the calcination rate increases and being decreased as the calcination rate decreases, whereby the acidity of the mixture to obtain the desired fluorination and the desired phosphorus content of the product is maintained despite variations in the rate of fluorine evolution as hydrogen fluoride rather than silicon tetrafluoride as the rate of calcination varies, and there is obtained a tricalcium phosphate product which consistently has the desired fluorine and phosphorus content.

It will be appreciated, with regard to establishing the optimum ratios of reactants for the initial calcination rate, this may be done by actual experimental determination, by reference to standard engineering charts, tables, and curves, manufacturer's specifications and data, or the like, or by various other suitable means which will be apparent to those skilled in the art. Additionally, once this determination has been made by one of the above or other suitable means, for future runs using the same operating conditions, the establishing of these optimum ratios may involve merely using the ratios which have been previously determined. Accordingly, it is to be understood that when reference is made hereinafter in the specification and claims to "establishing" the optimum ratios, it is intended to include both the actual determination, experimentally or otherwise, of these ratios as well as the mere using of the proper ratios which have been previously determined.

The raw materials used in the present process are phosphate rock, sulfuric acid, phosphoric acid, and water. The phosphate rock used may be from various sources, one suitable phosphate rock being Florida land pebble, although the present method is not to be taken as being limited to the use of that particular mineral. Similarly, various grades of phosphate rock may be used in the process although, from an economic standpoint, it is desirable that the rock have a bone phosphate of lime (hereinafter referred to as B.P.L.) concentration of at least about 72 percent, and preferably have a B.P.L. concentration of about 75 to about 77 percent. The advantages of using such higher B.P.L. concentration rock in the present process is principally one of cost in that when making a phosphate product of any given phosphorus concentration, using lower B.P.L. rock, larger amounts of phosphorus, in the more costly phosphoric acid form, must be added than where a higher grade of phosphate rock is used. Accordingly, in the description of the present invention which follows, primary reference will be made to the use of phosphate rocks containing about 75 percent B.P.L., an average analysis for Florida land pebble phosphate rock having this B.P.L. concentration being as follows:

| Constituents of phosphate rock, expressed as: | Percent by weight |
|---|---|
| CaO | 48.7 |
| $P_2O_5$ | 34.15 |
| B.P.L. (dry basis) | 75.37 |
| F | 3.75 |
| $SiO_2$ | 8.10 |
| $Fe_2O_3$ | 1.03 |
| $Al_2O_3$ | 0.96 |
| $H_2O$ | 1.00 |

Many additional elements such as K, Na, S, Mg, Mn, As, etc., occur in trace amounts in the rock and varying portions of these trace elements end up in the finished product. Although they are considered to have some nutritional value, they are of such small percentages in the rock that they need not be considered in the initial mixing step of the process. The desired control in the initial mixing step may be obtained by considering only the positive calcium cation ($Ca^{++}$) concentrations in the phosphate rock and initial mixture, and controlling the phosphorus pentoxide ($P_2O_5$) and sulfuric acid ($H_2SO_4$) contents of the initial mixture by proportioning the $H_3PO_4$ and $H_2SO_4$ to the CaO content of the mixture.

Desirably, the rock is ground and preferably to the extent that no more than about 15 percent of the ground rock, and preferably no more than about 12 percent, is retained on a 100 standard U.S. mesh screen. The surface area of the rock increases as the rock is more finely ground, and it is therefore advantageous to have a finely ground rock because the chemical reaction of the rock with the acids in the initial mixture is quicker and more complete. Since the degree of completion of the rock reaction is one measure of the extent of defluorination in the final product, a quick and complete reaction is to be desired.

The sulfuric acid used in making the initial mixture to be calcined may be of various strengths but is desirably equal to or greater than about 60 percent $H_2SO_4$ by weight. Additionally, it may be of various purities, e.g., from so-called alkylation or spent acids to commercial grade acid, as long as the impurities are of a nature to be eliminated in the high temperature calcining operation or they do not interfere with the reaction or harm the final product.

Alkylation grade sulfuric acid contains a considerable amount of expellable and/or combustible carbonaceous matter. If provisions can be made to control the odor, it is the most desirable type of sulfuric acid to use. It not only is a much cheaper source of $H_2SO_4$ than are most other grades, but its carbon content serves to bleach or decolorize the product during processing, so that a snow-white final product results.

The presence of carbonaceous matter from alkylation or spent grade sulfuric acid in the initial mixture is also advantageous in another way during the calcination step of the process. The combustion of the carbonaceous matter within the clinkers at calcination temperature is desirable in that it makes the clinkers porous and thereby more easily defluorinated at lower calcination temperatures.

In addition to the above advantages from use of a "dirty" sulfuric acid such as alkylation grade sulfuric acid, it has been found that use of such a sulfuric acid containing carbonaceous impurities results in a reduced amount of sulfur (usually calculated as $SO_4$ or as $H_2SO_4$) in the product after calcination. In contrast, defluorinated tricalcium phosphates prepared by the presently used methods of acid treatment of phosphate rock, and which are generally available commercially, invariably contain from about 2 to about 5 percent (by weight) of sulfate ($SO_4$), even though it has universally been considered desirable that the sulfate content of such products be as low as possible.

Accordingly, this lowering of sulfate content in tricalcium phosphate products is an important feature of the present invention. By using a sulfuric acid containing carbonaceous impurities, or by the equivalent alternative procedure of separately adding the carbonaceous materials in required amounts in case clear sulfuric acid is used, a defluorinated tricalcium phosphate product having a sulfur content equivalent to from about 0.1 percent to about 0.5 percent $SO_4$ (by weight) can be readily produced.

It has been found that the lowering of the sulfur content in the product has a definite relation to the color of the product. The "bleaching action" of alkylation sulfuric acid, mentioned above, is believed to be a result of the lowered sulfur content of the product. Products high in sulfur content are red or orange, whereas products low in sulfur content are light gray to white. Thus, if the sulfur content of the product can be adequately controlled, the product will consistently be white in color.

The phosphoric acid used may be either so-called "wet process" acid or the more pure electric furnace acid. The desired controllable water balance in the initial mixture to be fed to the kiln places the minimum strength phosphoric acid that is generally used at about 25 percent $P_2O_5$ by weight. Wet process, or crude, phosphoric acid is generally produced and available at a strength equal to or greater than 25 percent $P_2O_5$ by weight. Accordingly, for economic reasons, wet process phosphoric acid is preferred. As in the case of sulfuric acid, the impurities in the phosphoric acid are of no consequence in determining the relative amounts of the components in the initial mixture. Wet process phosphoric acid contains many trace elements which end up in, but do not detract from, the final product, and often also contains carbonaceous material of the types present in alkylation and spent grades of sulfuric acid. For economic reasons also, the calcium content of the phosphoric acid, usually expressed as calcium oxide (CaO), is desirably kept low, and it is not generally desirable to utilize the dry feeding process, to be described hereinafter, with wet processs phosphoric acid containing more than about 2 percent CaO by weight.

Two alternative methods of mixing the raw materials just described (i.e. phosphate rock, sulfuric acid, phosphoric acid, and water) are available according to the principles of the invention. One mixing method, which will be hereinafter referred to as the "dry" method, results quickly in a self-supporting mixture which is fed continuously directly to a kiln for calcination. The other mixing method which will be hereinafter referred to as the "wet" method, results in a slurry mixture which also is fed continously directly to a kiln for calcination. The kiln may be somewhat modified depending on which of the two mixing methods is to be used.

The steps of the overall method or process may be designated, in chronological order, as the mixing step and the calcination step. Then following the calcination step the tricalcium phosphate product is usually further processed, in more or less conventional fashion, to cool, size, and bag or load the product. The mixing step may be accomplished by either the "dry" method or the "wet" method, as has been earlier mentioned. The calcination step is modified slightly, also, depending on which method of mixing is used. With either method of mixing and calcination, the manner of controlling the reaction to give an exceptional product is the same.

The process involving dry mixing will be described first. Controlled amounts of ground phosphate rock, sulfuric acid, phosphoric acid, and water are introduced into a mixing and denning unit of the type commonly used for making ordinary superphosphate fertilizer. Sulfuric acid having a minimum strength of 80 percent $H_2SO_4$ should be used if a dry kiln feed is to be produced.

The ratios to be controlled in determining the quality of the finished tricalcium phosphate product are the ratio %$P_2O_5$/%CaO (by weight) and the ratio %$H_2SO_4$/%CaO only. No other chemical ratios in the initial mixture need be considered, except, as mentioned earlier, the amount of carbonaceous matter controlled to obtain the best product. The mixer of the superphosphate unit is usually a pub type mixer wherein rotating paddles accomplish the mixing, as will be known to those skilled in the art. The mixer produces a thixotropic slurry which is flowed onto a slowly moving slat conveyor, which constitutes the denning part of the superphosphate unit. The slurry sets and hardens as it advances to the discharge end of the slot conveyor, and from the discharge is fed continuously directly to the kiln used in the calcination step.

The accompanying drawing indicates graphically the changes in the ratios, %$H_2SO_4$/%CaO and %$P_2O_5$/%CaO which are found to produce a product of uniform composition and properties. The graph shows the changes in the ratios with change of percentage loading, by volume, of the kiln. Usually, phosphate kilns cannot be operated above about three to five percent loading, because of the deficient product obtained at higher loading rates. But according to the present invention, it is possible to use the maximum capacity of the kiln as used in other industries. Kilns in other services, such as in cement burning, are not ordinarily operated at a volume loading greater than about ten or twelve percent, but have been known to be operated at the higher loading rates shown. The %$H_2SO_4$/%CaO ratio is indicated by the dashed lines in the drawing, and the %$P_2O_5$/%CaO ratio is indicated by the solid lines. The ratio changes are indicated for products containing 15, 16, 17, 18, 19 and 20 percent P. Interpolations between and extrapolations beyond the sets or "families" or curves may be made, as for example, a ratio of %$H_2SO_4$/%CaO of 1.93 for a 15% P content product at a kiln loading volume of 19%. The curves presented in the drawing will hold true for practically all large types of rotary kilns, these being well known in the art, and an example of the type kiln intended being described hereinafter. The positions of the ratio curves on the drawing depends to some extent on the type of calcining equipment, and when a wide departure from the usual rotary kilns is to be made, it should be expected that the positions of the ratio curves may be changed. Variations because of calcining temperature changes may also be considered, as is explained hereinafter in a general way, but since to produce the desired product efficiently no severe calcining temperature changes are recommended, it is felt necessary only to explain the basis of approach to that problem. Accordingly, the methods herein described have made it possible to produce, from a given size of calcination equipment a much larger amount of product, having a more uniform grade and analysis.

The kiln, when the dry mixing method is used, is of a commonly used type, and preferably has a steel outer shell of cylindrical form, a firebrick lining in the shell, and is counter-current fired. The kiln is slightly inclined downwardly from the feed end, and rotates slowly about its longitudinal axis to cause the material fed to be moved therethrough. The described kiln is a counter-current fired rotary kiln which is well known in the art, but the invention is not limited thereto, various suitable kilns of other type being usuable in place thereof. It is only necessary that the kiln provide adequate agitation and that the temperature and time of holding of the material to be calcined be controllable. The described rotary kiln is usually and preferably equipped with brick flights which cause the material moving through the kiln to be lifted and tumbled as it moves, thereby increasing the flue gas contact with the material and increasing the speed of heating and defluorination. Exemplary of the calcining temperatures contemplated are temperatures between about 1900 degrees Fahrenheit and about 2700 degrees Fahrenheit.

The slurry mixture from the superphosphate unit, set and hardened by denning, is conveyed continuously to the feed end of the kiln and dropped thereinto. There is no need for sizing, screening, or other handling of the slurry mixture before feeding it to the kiln.

Once in the kiln, the mixture is heated relatively rapidly so that it dries and is then in a powder or lump form. As the kiln rotates, the material is progressively moved down the incline of the kiln, the flights in the kiln assisting in agitating and moving the material so that the flue gases flowing through the kiln in a direction opposite the material movement, are in intimate contact with the material. The temperature of the tricalcium phosphate material increases as it moves from the feed and toward the discharge end, or fire end, of the kiln. Near the fire end, the material reaches a maximum temperature which is measured and is used as the control temperature for kiln operation. This temperature is measured at a point in the kiln away from the walls thereof, and may be measured by an optical pyrometer, thermocouple, or other suitable means.

After the tricalcium phosphate material has been so heated it is discharged continuously from the kiln in substantially final form, except for the necessary cooling, sizing, screening, and bagging or loading operations which may be performed.

The process involving wet mixing is much the same as that described for dry mixing, and the chemical controls and kiln operation controls, which make for success or failure of the process, are the same and will be fully described hereinafter.

The process involving wet initial mixing is the preferred manner of practicing the invention. The advantages of wet mixing over dry mixing are that defluorination is easier and more complete, that the kiln may be operated at a lower temperature, that blending and feed and ratio control for the initial mixture is facilitated, that handling, conveying, storage and feeding throughout the process is made easier, that sulfuric and phosphoric acids of weaker strength may be used because of the increased moisture content of the wet mixture and that waste heat from the kiln may be used to pre-heat the wet mixed slurry.

The raw materials, phosphate rock, sulfuric acid, phosphoric acid, and water, are fed into a tank in the proper product proportions, to be described, and with sufficient water content to form a flowable slurry. It is desirable and preferred to use two tanks, the raw materials being fed into one, called the primary or reaction tank, and the other being used for blending, and called the secondary or blender tank. The tanks may be sized to give any holding time, but it is preferred that their combined capacity be able to hold at least about four hours' production to insure a stable slurry analysis. The slurry in the reaction tank, which is provided with suitable agitation means, overflows therefrom into the blender tank, which also has agitation means. Slurry in the blender tank is pumped continuously back, or recycled, into the reaction tank at a rate desirably equivalent to at least about four times the rate at which the raw materials are fed into the reaction tank in order that a composition as uniform as possible of the entire mass of slurry in both tanks may be obtained. The composition of the slurry in the blender tank will be exceptionally stable under these conditions, because the partially unreacted raw materials flowing from the reaction tank to the blender tank will always be blended with and greatly diluted by materials already reacted in both tanks. The chemical control analysis for the reaction and blender tank system is made on the slurry overflowing from the reaction tank to the blender tank.

It is desirable that the slurry temperature be maintained as high as possible so that a rapid reaction between the raw materials will be obtained. Preferably, the raw material reaction will be substantially complete by the time the slurry into which the raw materials are mixed is overflowed to the blender tank. Considerable heat is evolved when the rock, sulfuric acid, phosphoric acid, and water are mixed, the reaction being exothermic. Additionally, heat may be added to the reacting slurry by means of ordinary heat exchange equipment installed in the reaction and/or blender tanks through which hot flue gas from the kiln may be passed to heat the slurry. As one alternative, the hot flue gas from the kiln may be discharged beneath the surface of the slurry in one or both of the tanks, the flue gas rising through the slurry and escaping from its surface and thereby giving up heat directly to the slurry.

When wet initial mixing is used, it is desirable to include suitable means for adding water during mixing to maintain the flowable characteristics of the slurry, the high temperatures thereof causing continuous loss of water from the slurry. Similarly, in the case of dry mixing, secondary water addition may also be necessary to preserve the desired characteristics of the material.

In the wet mixing method, the slurry is withdrawn from the blender tank and continuously flowed into the feed end of the kiln. For the wet slurry feed, the kiln may be modified by installing breaker chains and/or chain curtains over at least a portion of the length of the interior of the feed end of the kiln. Breaker chains and chain curtains are well known in the art, several types being available, and require no description here to be clear to persons skilled in the arts of kiln structure and operation. The breaker chains and chain curtains prevent the build-up and fusion of the drying slurry at the feed end of the kiln. After the partially dried slurry has moved away from the feed end of the kiln toward the discharge or fire end of the kiln, it will behave substantially identically as in the case of the dry mixed material earlier described, and will be moved on to be heated and discharged from the kiln as before.

Regardless of which mixing method is used, the final product quality is controlled by controlling the ratios %$H_3PO_4$/%$CaO$ and %$H_2SO_4$/%$CaO$, earlier mentioned, of the material fed into the kiln, and by proper control of the kiln operation. The above ratios are established in conformity with the kiln operation, being dependent thereon.

Sulfuric acid is included in the initial mixture for the purpose of augmenting the acidulation of the phosphate rock which may be partially accomplished by the phosphoric acid. The phosphate rock is primarily in the form of fluorapatite, which may be represented by the chemical formula: $Ca_{10}F_2(PO_4)_6$. The purpose of the acidulation reaction is to break down the fluorapatite form whereby to release or displace the fluorine (F) therefrom, since the fluorine decreases the solubility of the mineral as well as being poisonous when consumed in too large amount by living organisms. Of importance when preparing phosphates for supplemental feeding uses, it has been determined that when fluorine occurs with phosphate minerals in an amount greater than one part fluorine (F) per one hundred parts phosphorus (P), by weight, then the nutritional value of the minerals for livestock and poultry feeding is impaired, and use of such minerals is dangerous because of the likelihood of poisoning the animals to which it is fed.

Defluorination of the phosphate rock is accomplished by chemical reaction of the rock with the acids. The use of sulfuric acid with the phosphoric acid permits defluorination to be accomplished in one acidulation step and at a lower kiln temperature and a higher feed rate to the kiln that can be accomplished if only phosphoric acid is used. In previously known processes the use of sulfuric acid was considered unnecessary but it has now been determined that the defluorination which is presently desired cannot be obtained without the presence of some sulfuric acid, a typical minimum ratio $\%H_2SO_4/\%CaO$ of about 0.500 in the initial mixture being shown in the drawing for products containing about 20% P. This is true regardless of whether wet or dry mixing is used in preparing the initial mixture.

The $\%P_2O_5/\%CaO$ ratio in the initial mixture must be varied depending on the CaO and $P_2O_5$ contents of the phosphate rock. The less $P_2O_5$ in the rock, the more $P_2O_5$ that must be added, as phosphoric acid, to give a product containing the desired amount of phosphorus.

The $\%P_2O_5/\%CaO$ ratio in the initial mixture must also be adjusted depending on the rate at which the initial mixture is to be fed to the kiln for the calcination step. This ratio adjustment may best be described by an example, with reference also to the drawing. Supposing that a particular kiln to be used is to be operated to make a product containing 19% P and to be loaded between 3 percent and 12 percent of the total volume of the kiln. If initial mixture, wet or dry, is continuously fed to the kiln to keep 3 percent of the kiln volume constantly filled with the material in various stages of drying and defluorinating, then for that particular kiln and feed rate a $\%P_2O_5/\%CaO$ ratio of 0.925 in the initial mixture, as read from the graph, gives a satisfactory $P_2O_5$, or P, content in the final product, in this case 19 percent P in the final product. Then, using the same kiln, suppose that the initial mixture feed rate to the kiln is increased to a rate sufficient to keep 12 percent of the kiln volume constantly filled. The $\%P_2O_5/\%CaO$ ratio must be accordingly increased to 0.960 in order that the product will contain the same amount of phosphorus (i.e. 19% P) as before. The ratio is increased as the filled, or loaded, kiln volume is increased. This phenomenon is brought about by the fact that the fluorine at low calcining rates is evolved mainly as silicon fluoride ($SiF_4$) and at high calcining rates it is evolved instead as hydrofluoric acid (HF), so that silicon (Si) which occurs in the rock is evolved in one case but not in the other. When the silicon is not removed during defluorination, it remains in the final product as a diluent causing the higher $\%P_2O_5/\%CaO$ ratio in the initial mixture to be required.

The controlled $\%H_2SO_4/\%CaO$ ratio of the initial mixture (kiln feed material) is varied considerably as shown in the drawing. Bearing in mind that the purpose of adding the sulfuric acid is to aid in defluorination, the amount of sulfuric acid used is only enough to effect satisfactory defluorination, and all except about 0.5% $H_2SO_4$ (analysis by weight in final product) is desirably driven off in the calcining operation. The exact $\%H_2SO_4/\%CaO$ ratio that will perform the desired function depends, as in the case of the $\%P_2O_5/\%CaO$ ratio, upon the kiln feed rate and on other variables of kiln operation. Fundamentally, the $\%H_2SO_4/\%CaO$ ratio variation depends on a production rate factor. The greater the continuous feed rate to the kiln (with factors such as kiln size, kiln temperature, kiln slope, speed of kiln rotation, and retention time of the calcining material in the kiln kept constant), the greater the $\%H_2SO_4/\%CaO$ ratio required for proper defluorination. Using the same example as before, the product containing 19% P at 3% kiln loading satisfactory defluorination, for a particular kiln, can be accomplished with a $\%H_2SO_4/\%CaO$ ratio of 0.673 as read from the drawing. For the same kiln conditions, only increasing the kiln loading to 12 percent of its volume, a $$\%H_2SO_4/\%CaO$$

ratio of about 1.160 is used for satisfactory defluorination. The apparent reason for this is that at high calcining rates the fluorine is evolved mainly as hydrofluoric acid (HF), the sulfur being evolved in both the sulfate and sulfite forms, so that the acidity of the material in the kiln is reduced as calcination proceeds. To maintain the acidity at the minimum satisfactory level there is used a larger proportion of $H_2SO_4$ in the feed material.

In the calcining step, it has been found that the final color of the product is indicative of correct calcination and of inclusion of a proper amount of carbonaceus materials in the initial mixture. The carbonaceous materials may be derived from alkylation sulfuric acid used in the initial mixture or may be added to the mixture in case the amount in the alkylation acid is insufficient or in case clear sulfuric acid is used. A product of relatively darker gray color indicates low conversion of fluorapatite to tricalcium ortho-phosphate ($Ca_3(PO_4)_2$), the desired product, and therefore a high fluorine content. A relatively lighter gray color indicates a properly calcined product, but of a fluorine content high within the allowable range. A product of orange color indicates excess (above about 0.5% $SO_4$) sulfur in the product. A product of white color indicates correct calcination and adequate control of the residual in the product.

Alkylation sulfuric acid normally contains from about three percent (3%) to about ten percent (10%) of the carbonaceous materials by weight. Adequate control of sulfur content and color in the product is realized when alkylation sulfuric acid having carbonaceous material content within this range is used in the amounts herein described. If acid of lower carbon content is used, or if the acid has no carbon content at all, then carbon or a carbonaceous material may be added to the initial mixture in order that the desired sulfur control and color control can be realized.

In this connection, a further control is desirable if optimum results are to be realized. This control has to do with the oxidizing-reducing conditions within the kiln during calcination. The chemical reactions brought about by the initial mixing step, which reactions continue at least through the initial period of calcination, result in the formation of calcium sulfate in some form in the material in the kiln. When the reaction of all the sulfuric acid in the initial mixture is completed, the amount of calcium sulfate in the kiln material will be substantially stoichiometrically equal to all of the sulfuric acid fed. Substantially all of this calcium sulfate must then be broken down or decomposed by heat during calcination in order that the sulfate content of the product will be low, and also in order that the calcium in the product will be correctly balanced with the phosphate to form tricalcium phosphate. Calcium sulfate ($CaSO_4$), when broken down by heat, forms its component substances CaO (lime) and $SO_3$ (sulfur trioxide). The CaO reacts with acid phosphate present to form tricalcium phosphate ($Ca_3(PO_4)_2$). Some of the SO, which is relatively unstable, further breaks down into $SO_2$ (sulfur dioxide) and O (oxygen).

The oxygen thus produced in the kiln intermixes with the combustion gases present in the kiln to affect the oxidizing-reducing nature of the gases. The carbonaceous materials introduced to the kiln with the initial mixture would be promptly burned if the kiln gases contained enough free oxygen to chemically combine therewith according to the following chemical equation: $C+O_2=CO_2$ (carbon dioxide). It is desirable that the oxygen for the above reaction be mainly supplied by the breaking down of $SO_3$ to $SO_2+O_2$ within the kiln rather than by providing a large excess of oxygen in the combustion gases from the burning of the fuel, i.e., the combustion gases from the burner, upon first contacting the material undergoing calcination, should contain only a low amount of free oxygen (should be slightly on the oxdizing side). In other words, the combustible fuel supplied to the burner should be provided with only enough oxygen to substantially completely burn the fuel, with only a slight excess.

By following this procedure, the $O_2$ freed in the kiln by decomposition of $SO_3$ will react with the carbonaceous material present. This results in a lowering of the partial vapor pressures of $O_2$ in the kiln at the surfaces of $CaSO_4$ being decomposed, which results in turn in a relative increase in the partial vapor pressures of $SO_3$ and $SO_2$ at the surfaces of the $CaSO_4$. Thereby an advantage in the breaking down of $CaSO_4$ is realized, which results in the lower final sulfur content of the product.

As already stated, when "dry mixed" kiln feed is used, the sulfuric acid added in the initial mixing step is desirably of a strength not less than about 80 percent $H_2SO_4$. Use of acids in this stronger range, 80 percent $H_2SO_4$ and above, will allow greater control over the water content of the initial mixture so that a kiln feed material of controlled porosity and grain or lump size can be uniformly obtained. On the other hand, when a "wet mixed" or slurry kiln feed is used, the sulfuric acid may be much weaker in strength, as low as 60 percent $H_2SO_4$ or even weaker, e.g., 30 percent $H_2SO_4$. In the latter case, since more water is used in the mixture, the extra water with the acid does not hinder control of the water content of the mixture. It should be understood, however, that the invention is not to be limited by the strength of either the sulfuric or phosphoric acid, since acids of any strength may be used provided the dry or wet kiln feed is not so wet or dilute as to be unmanageable according to the dry or wet mix procedure described above.

In the case of either dry or wet mixing, in order that a complete chemical reaction be obtained quickly, it is desirable that the initial mixture is at an elevated temperature. One method for heating the initial mixture is by preheating the sulfuric acid to above about 212 degrees Fahrenheit before it is added to the initial mixture. The heat introduced with the sulfuric acid, plus the exothermic heat of the reaction, will then suffice to keep the initial mixture at an elevated temperature, e.g., above about 240 degrees Fahrenheit, which is a desirable lowest mixture temperature. Many suitable alternative methods for heating the initial mixture may be used, however.

The following examples will serve to illustrate the invention, the dry mixing method being used in Examples 1–2 and the wet mixing method being used in Examples 3–4.

EXAMPLE 1

*Mixing step.*—To make a tricalcium phosphate product containing 19 percent P, 66 pounds/minute of ground 75 percent B.P.L. phosphate rock (Florida land pebble), 26.5 pounds/minute of crude wet process phosphoric acid containing 27.0 percent $P_2O_5$, 24.7 pounds/minute of 85 percent alkylation sulfuric acid (heated to 230° F.) and 4.0 pounds/minute of water are fed continuously into the mixer of a super-phosphate mixing and denning unit. The exothermic reaction takes place and the temperature of the mixture rises to 250 degrees Fahrenheit. The discharge from the den of the superphosphate unit is an almost dry mud-like material in small pellets or lumps of about quarter inch size and smaller. The size of the pellets is controlled by controlling the amount of water fed to the mixer, in this case 4.0 pounds/minute as stated above. Analyses are made at intervals on the material discharged from the den to the kiln in order to check the control ratios: $\%P_2O_5/\%CaO$ and $\%H_2SO_4/\%CaO$, and minor adjustments to the feed rates of the raw materials are made from time to time as deemed necessary. The total weight of raw materials fed is approximately 108 pounds/minute. Calcining will reduce this weight to approximately 67 pounds/minute at the kiln discharge.

The average analysis of the material discharged from the superphosphate unit to the kiln is:

| | |
|---|---|
| CaO _____ percent__ | 30.25 |
| $P_2O_5$ _____ do____ | 28.00 |
| $H_2SO_4$ _____ do____ | 19.65 |
| $\%P_2O_5/\%CaO$ _____ | 0.926 |
| $\%H_2SO_4/\%CaO$ _____ | 0.650 |

The moisture content of the material need not be analyzed for. It can be determined closely enough from the appearance of the material, which should be non-sticky and coherent but not completely dry.

At the given feed rates, when using the kiln described below, the $\%H_2SO_4/\%CaO$ ratio of 0.650 is sufficiently high to give good defluorination, and will give a product containing less than 0.5 percent $SO_4$ content when calcined.

*Calcining step.*—The kiln used for calcining the above material is a steel shell, brick-lined, rotary kiln of 135 feet length and 8 feet inside diameter. The kiln is direct fired countercurrent the flow of material therethrough, and the burning zone (fire end) temperature is 2400 degrees Fahrenheit. The kiln is mounted for axial rotation with a downward slope of ⅜ inch per foot from the feed end to the fire end, and the speed of rotation of the kiln is 0.60 revolutions per minute. The average retention time of materials fed to and discharged from the kiln is 135 minutes.

The total volume of the kiln is 6800 cubic feet, and the initial mixture described above will continuously occupy about 2.6 percent of the kiln volume, or about 175 cubic feet of the mixture in varying stages of calcination will be passing through the kiln at all times.

The material discharged from the superphosphate unit is fed directly and continuously into the feed end (high end) of the kiln, and the material moves continuously through the kiln to the burning zone, whereupon it is heated to 2400 degrees Fahrenheit. The material is then discharged at the fire end of the kiln and conveyed to suitable cooling and storage facilities. The product amounts to about 2 tons per hour at the given rates and has the following analysis and physical properties:

| | |
|---|---|
| CaO _____ percent__ | 47.80 |
| $P_2O_5$ _____ do____ | 43.92 |
| P _____ do____ | 19.17 |
| F _____ do____ | 0.05 |
| $SO_4$ _____ do____ | 0.16 |
| $P_2O_5$ soluble in 0.4% HCl _____ do____ | 43.38 |
| $P_2O_5$ availability in 0.4% HCl _____ | 98.77 |
| Color _____ | White |

The $P_2O_5$ availability in 0.4% HCl was determined by dissolving 0.5 grams of product in 100 milliliters of 0.4 percent HCl solution for one hour at 100 degrees Fahrenheit, and completed by the official Association of Agricultural Chemists analytical method for $P_2O_5$. At the present time this is the accepted chemical laboratory method for determining biological availability of phosphorus in mineral materials. The method is also considered as determinative of the percentage of the phosphorous which is in the ortho-phosphate form. All other chemical analyses appearing herein were made by accepted procedures.

EXAMPLE 2

*Mixing step.*—The mixture is made in the same manner as in Example 1, the raw material feed rates being increased to 132 pounds/minute of phosphate rock, 53.3 pounds/minute of phosphoric acid, 59.9 pounds/minute of sulfuric acid, and 8.0 pounds/minute of water.

The mixture has the following ratios:

| | |
|---|---|
| $\%P_2O_5/\%CaO$ _____ | 0.931 |
| $\%H_2SO_4/\%CaO$ _____ | 0.800 |

*Calcining step.*—The kiln of Example 1 is used, and the operation of the kiln is the same as in Example 1. Now, however, the initial mixture passing through the kiln at all times is about 350 cubic feet in volume and continuously occupies about 5.2 percent of the total kiln volume. The product, at a rate of 4 tons per hour, has the same chemical analysis and color as the product described in Example 1.

It should be noted that while the phosphate rock feed rate in Example 2 is double that in Example 1, the phosphoric acid and sulfuric acid feed rates in Example 2 are more than double those of Example 1, and the control ratios are different. This is the essence of the invention: that the ratios %$P_2O_5$/%CaO and %$H_2SO_4$/%CaO depend on the extent to which the kiln is occupied by material during calcination, and that to get the same product at different feed rates, the ratios must be adjusted.

Examples 3 and 4 illustrate the preferred wet-mixing embodiment of the invention:

EXAMPLE 3

*Mixing step.*—66 pounds/minute of ground 75 percent B.P.L. phosphate rock (Florida land pebble), 26.5 pounds/minute of crude wet process phosphoric acid containing 27.0 percent $P_2O_5$, 24.7 pounds/minute of 85 percent alkylation sulfuric acid, heated to 230 degrees Fahrenheit, and 40 pounds/minute of water are fed continuously into a reaction tank having a capacity of 1000 cubic feet and mixed to form a slurry. A blender tank, located next to and slightly lower than the reaction tank, also has a capacity of 1000 cubic feet. When the reaction tank is filled and raw material feeding continued at the rates stated above, the slurry overflows from the reaction tank to also fill the blender tank. A pumping arrangement is provided for continuously pumping about 50 gallons per minute of slurry from the blender tank back to the reaction tank, thereby causing the raw materials fed to the reaction tank to be diluted by the recirculating slurry. The recirculation rate is slightly greater than 4 times the raw material feed rate. After the system is in the condition described, slurry is continuously withdrawn from the blender tank at a rate equivalent to the raw material feed rate, and introduced directly into the feed end of the kiln. The temperature of the slurry is maintained above 240 degrees Fahrenheit.

The slurry overflowing from the reaction tank to the blender tank has the following analysis:

CaO _____ percent__ 22.73
$P_2O_5$ _____do____ 21.00
$H_2SO_4$ _____do____ 14.72
%$P_1O_5$/%CaO _____ 0.925
%$H_2SO_4$/%CaO _____ 0.650

The %$H_2SO_4$/%CaO ratio of 0.650 again is sufficiently great to give good defluorination but without an excess of sulfate remaining in the product after calcination.

*Calcining step.*—The kiln used in this example is the same as was used in Examples 1 and 2, except that in its feed end the kiln is equipped with chains and chain curtains to prevent formation of mud rings and to assist in pelletizing the feed when the slurry begins drying. The foregoing is standard practice in cement kilns. After the slurry is dry and in pellet form, which occurs shortly after the slurry is fed into the kiln, the material is moved along the kiln toward the fire end, and is heated to burning zone temperature as it passes through the burning zone. The product discharged from the kiln is identical with the product of Examples 1 and 2 and is handled in the same manner.

EXAMPLE 4

*Mixing step.*—198 pounds/minute of ground phosphate rock, 80.4 pounds/minute of phosphoric acid, 107.6 pounds/minute of sulfuric acid, and 120 pounds/minute of water are continuously mixed similarly as in Example 3. The reaction and blender tanks each have a capacity of 1000 cubic feet as in Example 3 so that a reaction time of at least 4 hours is allowed. The slurry withdrawn from the blender tank for feeding the kiln has the following ratios:

%$P_2O_5$/%CaO _____ 0.936
%$H_2SO_4$/%CaO _____ 0.940

Note that the feed rate for phophoric acid is somewhat over triple the rate of Example 3, and that the feed rate for sulfuric acid is quadrupled, even though the rock feed rate and expected product are only tripled. The ratio changes are greater than between Examples 1 and 2.

*Calcining step.*—The kiln is the same as in Example 3, and the operation thereof is the same. A product identical with the products of the other examples is discharged and handled as before.

It has been emphasized in the foregoing examples of the method that the product is the same regardless of the rate of production. This invention is to be distinguished from the older known processes in that regard, and the products which are derived from the older processes are not consistent in either composition or appearance, since control over their variations cannot be achieved without strict adherence to the concepts herein presented. As a result, feed mixing plants using the older products have been forced to compensate in some manner for the product discrepancies, and spotty-appearing mixed products have almost resulted because of variations in color of the phosphate minerals added as components.

The invention herein portrayed is further to be distinguished from older processes because of the snow-white product resulting from the methods, previously mentioned. It has heretofore been impracticable to use the low-grade alkylation sulfuric acids because of the resultant unsatisfactory and variable color of the products, but by following the concepts of the present invention, a uniform product of snow-white color is always obtained. Therefore, and distinguishing over the older methods, it is now preferred to use alkylation sulfuric acid or some other low-grade acid having a high content of carbonaceous impurities.

Referring again to kiln operation, the burning zone temperature in the kiln, regardless of which mixing method is followed and regardless of the production rate, may be varied with an opposite variation in the %$H_2SO_4$/%CaO ratio required in order to obtain the same defluorination in the product. In other words, if the kiln temperature is increased the ratio may be decreased, and if the kiln temperature is decreased the ratio must be increased. For the best results, the kiln temperature must be such that the material being calcined will be slightly fused. The fusion temperature of the material will vary depending on the type of product being made, and can easily be determined. The older processes avoided fusion when calcining the material, but when slight fusion occurs when following the present process, a higher degree of defluorination results. Some experience by the operator of the kiln is usually necessary before the desired slight fusion can be maintained during calcination.

Referring again to the drawing the upper ranges of kiln loading will seldom be used because of the practical aspects of kiln operation. However, the present invention makes it possible to achieve operation in the middle and upper parts of the kiln loading range, whereas with the older methods this was never achieved. Therefore, this invention makes it possible to produce from two to six times as much product as before from the same calcination equipment, provided the principles of changing the feed ratios are adhered to. When dry mixing is used, the method is somewhat limited when the ranges represented by the extreme upper and right-hand parts of the graph are approached, since it becomes impossible to maintain a dry feed because of the high acid feed rates. But operations with dry feeding far exceed production by the older methods wherein the ratios were not changed. The wet feed method is not so limited, and is therefore recommended for highest capacity in the plant.

While there have been described various embodiments of the present invention, the compositions and methods described are not intended to be understood as limiting the scope of the invention as it is realized that changes therewithin are possible and it is further intended that each element recited in any of the following claims is to be understood as referring to all equivalent elements for accomplishing substantially the same results in substantialy the same or equivalent manner, it being intended to cover the invention broadly in whatever form its principle may be utilized.

What is claimed is:

1. In a process for making a defluorinated tricalcium phosphate product, wherein a mixture of sulfuric acid, phosphoric acid, and phosphate rock containing fluorine and silicon values, in amounts sufficient to form a tricalcium phosphate is calcined at a temperature sufficient to evolve fluorine values from the phosphate rock, the improvement which comprises admixing sulfuric acid, phosphoric acid, and the phosphate rock in amounts sufficient to produce a tricalcium phosphate product having a phosphorus content of at least 15 percent by weight and a fluorine content not greater than $\frac{1}{100}$ of the phosphorus content, the ratio of percent by weight sulfuric acid to percent by weight calcium oxide in the admixture being within the range of about 0.5 to about 1.6 and the ratio of percent by weight $P_2O_5$ to percent by weight CaO in the admixture being in the range of about 0.72 and about 1.05, adding said admixture to a rotary kiln in an amount sufficient to provide a loading of the kiln of up to 18% by volume of the kiln, calcining the thus-obtained admixture in the kiln at a temperature above the fusion temperature of the mixture for a period of time sufficient to produce a substantially snow-white tricalcium phosphate product having a phophorus content of at least about 15% by weight of the product and a fluorine content which is not greater than about $\frac{1}{100}$ of the phosphorus content, and controllably varying the ratios of sulfuric acid and phosphoric acid to calcium oxide in the admixture to be calcined as the loading of the kiln varies up to 18% by volume of the kiln, the ratios being varied within the ranges set forth above, the percent by weight $P_2O_5$ to percent by weight CaO and percent by weight $H_2SO_4$ to percent by weight CaO ratios being increased as the kiln loading increases and being decreased as the kiln loading decreases.

2. The process as claimed in claim 8 wherein there is included in the mixture to be calcined carbonaceous material in an amount at least sufficient to effect a lowering of the sulfate content of the tricalcium phopshate product to at least about 0.5 percent by weight.

3. The process as claimed in claim 2 wherein the amount of carbonaceous material added is within the range of about 3 to about 10 percent by weight of the sulfuric acid added to the mixture to be calcined.

4. The process as claimed in claim 2 wherein the addition of the carbonaceous material is effected by using alkylation sulfuric acid containing carbonaceous matter as the sulfuric acid used in the process.

5. The process as claimed in claim 8 wherein the mixture, prior to calcination, contains sufficient water so that the mixture is in the form of a slurry at the commencement of the calcination.

6. The process as claimed in claim 5 wherein after preparation, the mixture in the form of a slurry, is calcined substantially immediately, with substantially no aging.

7. The process as claimed in claim 8 wherein the temperature at which the calcination is carried out is within the range of about 1900 to about 2700 degrees Fahrenheit.

8. The process as claimed in claim 1 wherein the tricalcium phosphate product produced has a phosphorus content within the range of about 15 to about 20% by weight of the product.

References Cited by the Examiner
UNITED STATES PATENTS

| | | | |
|---|---|---|---|
| 2,565,351 | 8/1951 | Butt | 23—108 |
| 2,795,484 | 6/1957 | Le Baron | 23—108 |
| 2,865,710 | 12/1958 | Le Baron | 23—108 |

MAURICE A. BRINDISI, *Primary Examiner.*